April 5, 1927.  
J. M. DORTON  
1,623,395  
DIRIGIBLE HEADLIGHT  
Filed March 23, 1925   2 Sheets-Sheet 1
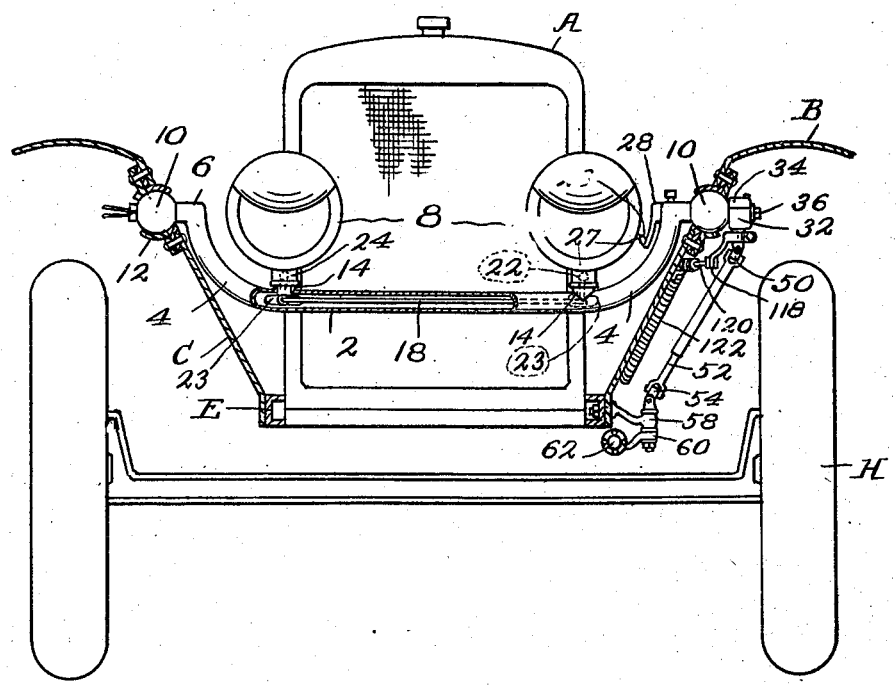
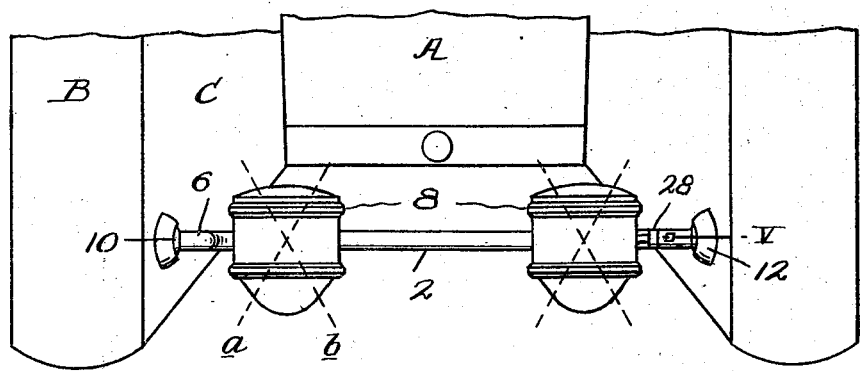
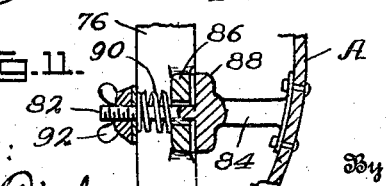
Witness:  
Fred G. Fischer.
Inventor:  
John M. Dorton,  
By F. G. Fischer,  
Attorney.

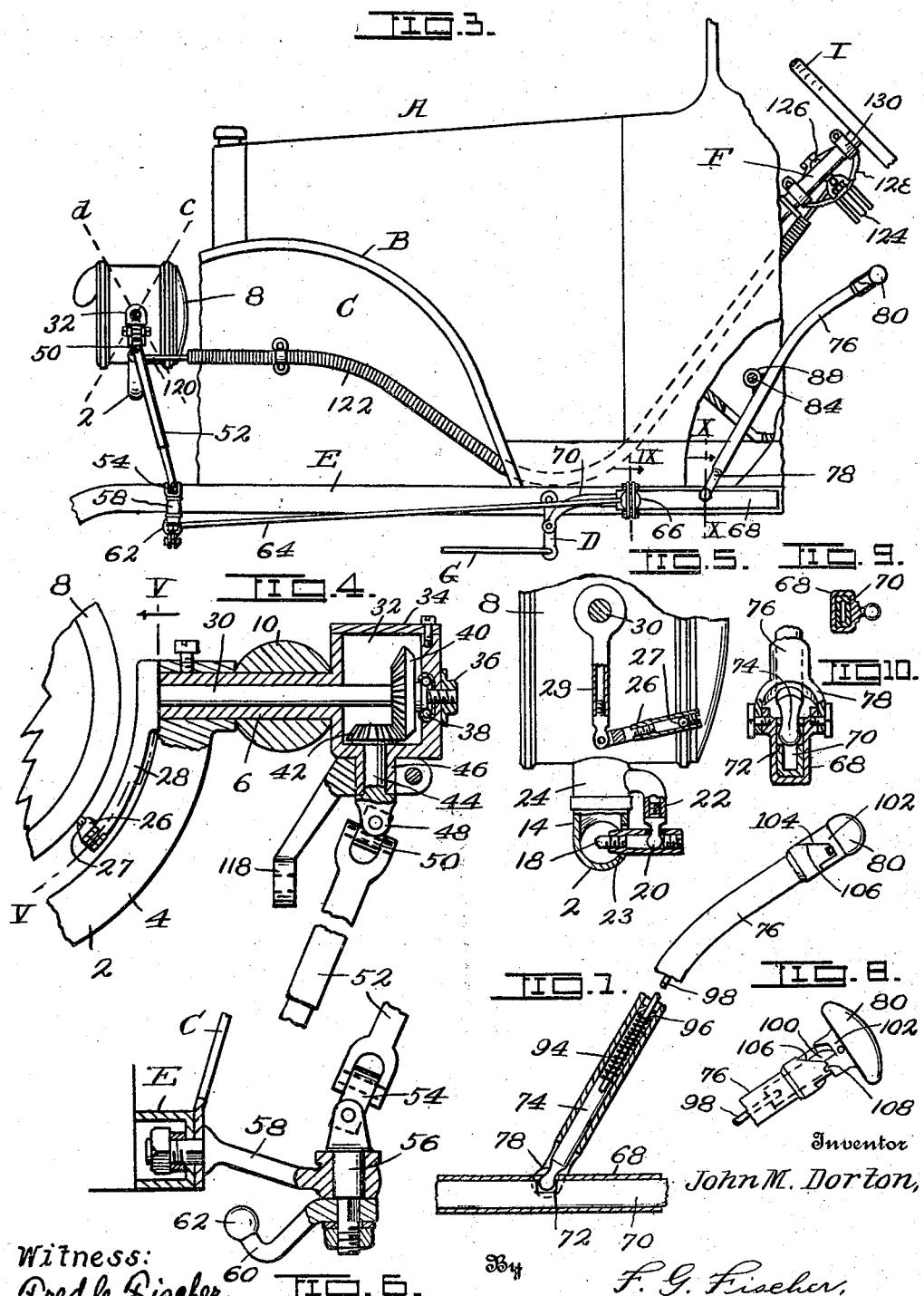

Patented Apr. 5, 1927.

1,623,395

UNITED STATES PATENT OFFICE.

JOHN M. DORTON, OF BONNER SPRINGS, KANSAS.

DIRIGIBLE HEADLIGHT.

Application filed March 23, 1925. Serial No. 17,734.

My invention relates to dirigible headlights for motor vehicles and embodies mechanism connecting said headlights to the steering mechanism, so that the latter will automatically control the former and cause the same to light the road in advance of the vahicle whether the same is being driven in a straight course or rounding curves in a road.

The invention also embodies mechanism whereby the driver may adjust the aforementioned headlight controlling mechanism to inactive position without leaving his seat, so that the headlights will remain in fixed position irrespective of the direction in which the steering mechanism is turned.

The invention also embodies manually-controlled mechanism whereby the driver may tilt the headlights up and down without leaving his seat in the vehicle.

Other features will hereinafter appear, and in order that the invention may be fully understood reference will now be had to the accompanying drawings, in which:

Figure 1 is a fragmentary front elevation of a motor vehicle equipped with the invention.

Fig. 2 is a broken plan view showing some of the parts disclosed by Fig. 1.

Fig. 3 is a fragmentary side elevation of the motor vehicle equipped with the invention.

Fig. 4 is an enlarged fragmentary detail section on line IV of Fig. 2, with the fender apron and socket removed.

Fig. 5 is an irregular section on line V—V of Fig. 4, with the axes of the headlight added.

Fig. 6 is a broken front elevation partly in section of a part of the mechanism for automatically turning the headlights to the right or left.

Fig. 7 is a broken sectional view partly in elevation, of means for adjusting to active or inactive position the mechanism for turning the headlights to the right or left.

Fig. 8 is a fragmentary side elevation of the upper portion of the parts disclosed by Fig. 7.

Fig. 9 is a cross section on line IX of Fig. 3, with a socket for the ball-joint removed.

Fig. 10 is a section on line X—X of Fig. 3.

Fig. 11 is a section on line IX—IX of Fig. 3.

Referring in detail to the different parts, A designates the forward portion of the motor vehicle which is equipped with the conventional front fenders B, aprons C, steering arm D, chassis E, steering post F, and connecting rod G for transmitting motion from said arm D to the steering knuckles, not shown, of the front wheels H.

2 designates a rockable headlight bar mounted at the forward portion A of the motor vehicle and which is curved upwardly near its ends as indicated at 4 and terminates in a pair of trunnions 6 axially arranged on a horizontal plane extending centrally through the headlights 8, Fig. 1. The trunnions 6 are provided with fixedly mounted balls 10, which are rockably mounted in sockets 12 firmly secured to the upper portions of the aprons C. The balls 10 permit the sockets 12 to be adjusted to fender aprons arranged at different inclinations and also provide axes on which the bar 4 may rock to tilt the headlights 8 up or down, as will hereinafter appear.

The lower horizontal portion of the bar 4 is provided with vertical axes 14 upon which the headlights 8 are mounted to turn to the right or left. The headlights 8 are connected to turn together to the right or left, as indicated by dotted lines a and b, Fig. 2, by a rod 18, which is connected at its ends by universal joints 20 with arms 22 fixed to the rear portions of hubs 24 mounted on the axes 14 and supporting the headlights 8, Figs. 1 and 5. The bar 4 is preferably hollow throughout its length to reduce weight and also to admit the rod 18 and the usual wiring for the headlights 8. The outturned ends 21 of the rod 18 project through slots 23 formed in the bar 4 to permit longitudinal movement of the same and also allow said ends to be connected to the arms 22, as above stated.

The mechanism whereby the headlights 8 are automatically turned to the right or left as indicated by the dotted lines a and b, Fig. 2, will now be described. 26 designates a link connected at one end by a universal joint 27 to one of the headlights 8 and pivotally connected at its opposite end to the lower end of a crank 28, Figs. 4 and 5, fixed at its upper end to a shaft 30, journaled in the adjacent trunnion 6 which is provided at its outer end with a gear box 32 having a removable lid 34, so that access may be had to the interior of said gear box 32. As shown by Fig. 4, the shaft 30 extends through the gear box 32 and is provided at its reduced threaded outer end with a nut 36 whereby it is held in engagement with a thrust ball-bearing 38.

The intermeshing bevel gears 40 and 42 are arranged within the gear box 32, the gear 40 being fixedly mounted upon the shaft 30 and the gear 42 upon a shaft 44 journaled in a bearing 46 depending from the bottom of said gear box 32. The lower end of the shaft 44 is provided with a depending bifurcated member 48 connected by a universal joint 50 to the upper end of a telescopic shaft 52, which is connected at its lower end by a universal joint 54 to the upper end of a stub shaft 56 journaled in a bracket 58 fixed to the adjacent side of the chassis E, Figs. 1 and 6.

The lower end of the shaft 56 is provided with a fixedly mounted crank arm 60 connected by a universal joint 62 to the forward end of a connecting rod 64, which is connected at its rear end by a universal joint 66 to a sleeve 68 slidably mounted upon a bar 70 pivotally connected at its forward end to the steering crank D, which is connected to the steering knuckles of the front wheels H, in the conventional way by the rod G. The bar 70 is provided intermediate its ends with a notch 72, Figs. 7 and 10, to receive the lower end of a bolt 74 whereby the sleeve 64 and the bar 70 may be locked together.

The bolt 74 is slidably mounted in the lower end of a tubular lever 76 pivotally connected at its lower bifurcated end 78 to the sleeve 68 and provided at its upper end with an adjustable handle 80 arranged within convenient reach of the driver. The lever 76 and the bracket 84 are provided with rosettes 86 and 88, the former of which is yieldably held in engagement with the latter by a spring 90 adapted to be tensioned by a nut 92 threaded on the pivot 82.

The bolt 74 is yieldably held in engagement with the notched portion 72 of the bar 70 by a spring 94 interposed between the upper end of said bolt 74 and a stop 96 fixed to the interior of the lever 76, Fig. 7. The bolt 74 may be retracted against the action of the spring 94 and raised out of engagement with the notched portion 72 of the bar 70 by the handle 80 and a wire or flexible rod 98 connected at its ends to said bolt 74 and a shank 100 slidably mounted in the upper portion of the lever 76 and fixed to the handle 80.

The underside of the knob 80 has a boss 102 with a beveled face 104 for engagement with a correspondingly beveled surface 106 at the upper enlarged end of the lever 76. By turning the knob 80 a quarter of a revolution in one direction the beveled face 104 is caused to travel up the beveled surface 106 and thereby effect withdrawal of the bolt 74 from the notched portion 72 of the bar 70. By continuing to turn the knob 80 a lug 108, Fig. 8, on the boss 102 is caused to enter a corresponding recess in the enlarged end of the lever 76 and thus relieve the driver of the necessity of holding said knob 80 in the turned position.

With the aforementioned mechanism it is apparent that when it is desired to have the headlights 8 automatically turn to the right or left with the front wheels H of the vehicle when rounding a turn in the road, it is only necessary to adjust the knob 80 in position to permit the spring 94 to force the bolt 74 into the notched portion 72 of the bar 70, so that as the steering arm D is moved back or forth in the conventional way by turning the steering wheel I, said bar 70 will move the sleeve 68 back and forth, and through the intermediacy of the connecting rod 64, the crank arm 60, the telescopic shaft 52, the bevel gears 42 and 40, the shaft 30, the crank arm 28 and the link 26, the headlights 8 will be turned with the front wheels H, as stated. When in position for the automatic operation just described, the nut 92 is loosened so that the hand lever 76 will be free to rock back and forth on the pivot 82, as the sleeve 68 moves back and forth.

When it is desired to hold the headlights 8 from turning to the right or left with the front wheels H, the knob 80 is turned and raised, Fig. 8, to withdraw the belt 74 from engagement with the notched portion of the bar 70, so that the same may move back and forth with the steering arm D without moving the sleeve 68 therewith, the latter being held stationary by the lever 76, which in turn is prevented from rocking on the pivot 82 by tightening the nut 92 and thereby causing the ratchet faces of the rosettes 86 and 88 to become interlocked.

When it is desired to manually turn the headlights 8 to the right or left the nut 92 is loosened and with the knob 80 in raised position, Fig. 8, to hold the bolt 74 out of the notch 72, the sleeve 68 may be moved back and forth, and through the intermediacy of the connecting mechanism, turn the headlights 8, as stated.

The mechanism for tilting the headlights 8 up and down will now be described in detail: 118 designates a crank arm clamped upon the bearing 46, Fig. 4, and pivotally connected to the forward end of a flexible rod 120, Fig. 3, which extends through a flexible tube 122 and is pivotally connected at its rear end to a lever 124 fulcrumed at 126 upon a segment 128 secured by clamps 130 to the upper portion of the steering post F. By moving the lever 124 downwardly the headlights are tipped upwardly, and by moving the lever 124 upwardly said headlights 8 are turned downwardly through the intermediacy of the rod 120, the crank arm 118, the gear box 32, and the rockable bar 4.

Having thus described my invention, what I claim and desire to secure by Letters Patent, is:

1. In a dirigible headlight for motor vehicles, a support carrying a headlight arranged to turn to the right or left, a member actuated by the steering gear of the motor vehicle, a second member loosely connected to the first-mentioned member, a link connected to said headlight, a crank connected to said link, a journaled shaft upon which said crank is fixedly mounted, a gear wheel fixedly mounted upon said shaft, a second gear wheel for driving the first gear wheel, mechanism connecting said second gear wheel and said second member, and manual means whereby said second member may be fixed to said first member so that the headlight may be automatically turned to the right or left with the steering gear, or released from said second member so that the headlight may be held stationary or turned independently of the steering gear.

2. In dirigible headlights for motor vehicles, a pair of headlights connected together and mounted to turn to the right or left, a bar operably connected to and actuated by the steering gear of the motor, a sleeve slidably mounted upon said bar, mechanism connecting said sleeve to one of the headlights, a tubular lever operably connected to the sleeve to slide the same upon the bar and effect the turning of the headlights to the right or left independently of the steering gear, a bolt slidably mounted in said tubular lever and adapted to lock the sleeve and the bar together to effect turning of the headlights with the steering mechanism, and a handle turnable on the lever for disengaging the bolt from the bar and provided with a beveled surface coengaging a complemental surface on the lever.

In testimony whereof I affix my signature.

JOHN M. DORTON.